(12) United States Patent
Varadi et al.

(10) Patent No.: US 7,187,102 B2
(45) Date of Patent: Mar. 6, 2007

(54) PIEZOELECTRIC MOTOR CONTROL

(75) Inventors: Peter C. Varadi, Albany, CA (US);
Björn B. Magnussen, Iserlohn (DE);
Dieter A. Schuler, Stuttgart (DE)

(73) Assignee: Elliptec Resonant Actuator AG, Dortmund (DE)

( * ) Notice: Subject to any disclaimer, the term of this patent is extended or adjusted under 35 U.S.C. 154(b) by 272 days.

(21) Appl. No.: 10/503,787

(22) PCT Filed: Feb. 6, 2003

(86) PCT No.: PCT/US03/03707

§ 371 (c)(1),
(2), (4) Date: Jan. 10, 2005

(87) PCT Pub. No.: WO03/067746

PCT Pub. Date: Aug. 14, 2003

(65) Prior Publication Data

US 2005/0110368 A1    May 26, 2005

Related U.S. Application Data

(60) Provisional application No. 60/355,172, filed on Feb. 6, 2002.

(51) Int. Cl.
*H01L 41/08* (2006.01)
(52) U.S. Cl. ............. 310/316.01; 310/317; 310/323.02
(58) Field of Classification Search ........... 310/316.01, 310/316.02, 323.02, 328, 317
See application file for complete search history.

(56) References Cited

U.S. PATENT DOCUMENTS 2,930,912 A    3/1960 Miller (Continued)

FOREIGN PATENT DOCUMENTS

DE    4224284    1/1993

(Continued)

OTHER PUBLICATIONS

Ragulskis, K. et al, *Vibromotors for Precision Microrobots*, p. 5-6, published by Hemisphere Publishing Corporation in 1988.

*Primary Examiner*—Mark Budd
(74) *Attorney, Agent, or Firm*—Stetina Brunda Garred & Brucker

(57) ABSTRACT

A piezoelectric system has a piezoelectric motor (20) driving a driven element (22) so as to move the driven element (822) in response to an electric signal (25). The motor (20) has at least a first optimal operating frequency at which the motor (20) moves the driven element (22) an amount that meets predetermined criteria. The motor (20) and driven element (22) have a desired performance criteria when operated at that first operating frequency. A plurality of concatenated sinusoidal sweeping frequencies are repeatedly supplied to the piezoelectric motor (20) with at least one of the sweeping frequencies being sufficiently close to the first operating frequency to cause detectable motion of the driven element (22). The frequencies are varied in response to movement of at least one of the motor (20) and the driven element (22) to produce an average performance of the motor (20) and driven element (22) for a time corresponding to the time for one sweep of frequencies. The average performance is greater than an actual performance of the driven element (22) for the same period of time but when the actual performance is less than the desired performance.

26 Claims, 4 Drawing Sheets

U.S. PATENT DOCUMENTS

| | | |
|---|---|---|
| 2,939,106 A | 5/1960 | Mason |
| 2,998,535 A | 8/1961 | Church et al. |
| 3,368,085 A | 2/1968 | Mc Master |
| 3,469,119 A | 9/1969 | Parkinson |
| 4,019,073 A | 4/1977 | Vishnevsky et al. |
| 4,049,981 A | 9/1977 | Durr |
| 4,400,641 A | 8/1983 | Vishnevsky et al. |
| 4,420,826 A | 12/1983 | Marshall et al. |
| 4,453,103 A | 6/1984 | Vishnevsky et al. |
| 4,535,346 A | 8/1985 | Lichti |
| 4,600,851 A | 7/1986 | Isayama et al. |
| 4,658,650 A | 4/1987 | Yorinaga et al. |
| 4,663,556 A | 5/1987 | Kumada |
| 4,692,672 A | 9/1987 | Okuno |
| 4,857,791 A | 8/1989 | Uchino et al. |
| 4,893,045 A | 1/1990 | Honda |
| 4,941,202 A | 7/1990 | Upton |
| 4,959,580 A | 9/1990 | Vishnevsky et al. |
| 5,030,873 A | 7/1991 | Owen |
| 5,073,740 A | 12/1991 | Jomura et al. |
| 5,109,698 A | 5/1992 | Owen |
| 5,155,709 A | 10/1992 | Flanagan et al. |
| 5,162,692 A | 11/1992 | Fujimura |
| 5,216,313 A | 6/1993 | Ohinishi et al. |
| 5,462,604 A | 10/1995 | Shibano et al. |
| 5,469,011 A | 11/1995 | Safabakhsh |
| 5,500,578 A | 3/1996 | Kawamura |
| 5,566,132 A | 10/1996 | Janus et al. |
| 5,578,888 A | 11/1996 | Safabakhsh |
| 5,682,076 A | 10/1997 | Zumeris |
| 5,734,236 A | 3/1998 | Motegi |
| 5,821,667 A | 10/1998 | Takagi et al. |
| 5,900,691 A | 5/1999 | Reuter et al. |
| 5,907,211 A | 5/1999 | Hall et al. |
| 5,955,819 A | 9/1999 | Takano et al. |
| 6,066,911 A | 5/2000 | Lindemann et al. |
| 6,068,256 A | 5/2000 | Slutskiy et al. |
| 6,072,267 A | 6/2000 | Atsuta |
| 6,163,100 A | 12/2000 | Morizaki et al. |
| 6,242,850 B1 | 6/2001 | Slutskiy et al. |
| 6,262,514 B1 | 7/2001 | Bansevicius et al. |
| 6,262,515 B1 | 7/2001 | Yerganian |
| 6,294,859 B1 | 9/2001 | Jaenker |
| 6,316,863 B1 | 11/2001 | Schuh et al. |
| 6,320,298 B1 | 11/2001 | Kawabe |
| 6,371,587 B1 | 4/2002 | Chang |
| 6,384,514 B1 | 5/2002 | Slutskiy et al. |
| 6,469,419 B2 | 10/2002 | Kato et al. |
| 6,512,321 B2 | 1/2003 | Yoshida et al. |
| 6,690,101 B2 | 2/2004 | Magnussen et al. |
| 2001/0009343 A1 | 7/2001 | Sawai et al. |
| 2002/0027423 A1 | 3/2002 | White |
| 2002/0121869 A1 | 9/2002 | Kenichi et al. |

FOREIGN PATENT DOCUMENTS

| | | |
|---|---|---|
| DE | 19928780 | 1/2001 |
| DE | 10035168 | 2/2002 |
| EP | 0518262 A2 | 12/1992 |
| EP | 0569673 B1 | 11/1993 |
| EP | 0712170 A1 | 5/1996 |
| EP | 0725450 A1 | 8/1996 |
| EP | 0643427 A1 | 11/1997 |
| EP | 0849813 A1 | 6/1998 |
| EP | 0924778 A2 | 6/1999 |
| EP | 0924778 A3 | 6/1999 |
| EP | 0951078 A1 | 10/1999 |
| GB | 1510091 | 5/1978 |
| JP | 62217880 | 9/1987 |
| JP | 2260476 | 10/1990 |
| JP | 02260582 | 10/1990 |
| JP | 04351200 | 12/1992 |
| JP | 06286401 | 10/1994 |
| JP | 08019275 | 1/1996 |

PIEZOELECTRIC MOTOR CONTROL

CROSS-REFERENCE TO RELATED APPLICATION

This application claims the benefit of U.S. Provisional Application No. 60/355,172, filed Feb. 6, 2002, the entire content of which is hereby incorporated by reference.

FIELD OF INVENTION

This invention relates to a method and apparatus for controlling piezoelectric motors and the resulting combination of piezoelectric motors and the control systems therefor.

BACKGROUND OF THE INVENTION

In piezoelectric motors, one or more piezoelectric elements are excited with electrical signals to extend and contract in order to generate a microscopic mechanical motion within the motor that is transformed into a macroscopic motion of a driven element. In part, piezoelectric motor designs differ in the electric signals used to excite the motions, in the form of the microscopic motion, and in the mechanism used to transform the microscopic motion into a macroscopic motion.

Piezoelectric motors take various forms and have various control systems. Some piezoelectric motors operate principally with sinusoidal electric signals of a single frequency, and are referred to here as single-frequency motors. The single frequency piezoelectric motors contrast with piezoelectric motors that require special waveforms for operation, such as triangular waveforms, such shaped waveforms having frequency spectra that are the composite of many frequencies with the overall result being a shaped waveform. Some single-frequency piezoelectric motors may also be operated with electrical signals that contain other frequency components, but it is not necessary to include additional frequency components for proper operation of a single-frequency piezoelectric motor. Single-frequency piezoelectric motors may also have more than one operational frequency that, when used at distinct times, result in distinct macroscopic motions of the driven element at those times. For example, U.S. Patent Publication No. 2002/0038987A1, the entire contents of which are hereby incorporated by reference, discloses embodiments that include single-frequency piezoelectric motors that have two distinct operational frequencies, one for a forward motion and one for a backward motion of a driven element.

The optimal frequency of operation, i.e., the frequency at which the mechanical output and performance of a piezoelectric motor is in some sense optimal, is typically related to a mechanical resonance. The optimal frequency therefore varies with several factors, such as temperature. Ambient temperature can change and vary the performance, and piezoelectric motors warm up during operation and that can affect performance. Further effects that influence the optimal frequency of a piezoelectric motor during its lifetime include fatigue, wear such as abrasion between the piezoelectric motor and the driven element, and other factors. Furthermore, differences during manufacturing and assembly and general tolerances result in a different optimal frequency for any two piezoelectric motors of the same design and manufacture. Finally, even if the optimal operating frequency was known beforehand, it is not guaranteed that the electronic circuit supplying the electric signal is able to generate the optimal frequency exactly, since the circuitry itself is subject to effects of temperature changes, aging, and manufacturing tolerances.

There is thus a need for an electrical driving circuit that drives a piezoelectric motor at or near its optimal frequency of operation by employing means of control. Prior art includes Phase Locked Loop (PLL) feedback control solutions. It is known that when a typical piezoelectric motor is excited close to its operational resonance frequency, there occurs a phase difference between the excitation signal and the vibration of the piezoelectric motor. If the vibration can be measured, a PLL may be able to exploit this phase difference and continuously track the operation frequency of the piezoelectric motor. PLL requires a dedicated continuously operating control circuit, and it is limited by the frequency range in which a phase difference is discernible, and is further limited by various electrical noise factors. PLL works only for piezoelectric motors where there is a clear monotonous relationship between the measured phase difference and the quality (strength, speed, etc.) of the resulting macroscopic motion. This relationship may not exist for all piezoelectric motor designs.

There is thus a need for control schemes that can drive a single-frequency piezoelectric motor sufficiently near its optimal frequency of operation but that are less dependent on the particularities of the piezoelectric motor and that can accommodate more variation in the piezoelectric motor design and manufacture.

BRIEF SUMMARY OF THE INVENTION

A piezoelectric motor is provided that is in driving contact with a driven element so as to move the driven element in response to an electric signal provided to the motor. The motor has at least a first optimal operating frequency at which the motor moves the driven element an amount that meets predetermined operational criteria. The motor and driven element have a desired performance criteria when operated at that first operating frequency. As the motor and/or the driven element degrade, or as manufacturing tolerances cause the motor and driven element to perform less efficiently than desired, or as the signal to the motor varies from the optimal driving frequency, the performance begins to degrade outside the desirable limits, and ultimately degrades to a point where the performance is outside an acceptable range of performance criteria.

To compensate for this natural performance degradation, a plurality of concatenated sweeping frequencies is repeatedly supplied to the piezoelectric motor. At least one of the sweeping frequencies is sufficiently close to the first operating frequency or to an alternative resonance frequency of the motor and/or combined motor and driven element to cause detectable motion of the driven element. Preferably, the sweeping frequencies result in an average performance that exceeds the performance of the motor and/or driven element when they begin to deviate from the desired performance criteria. The composition of the sweeping frequencies can be varied in order to maximize the performance so that it approaches, and preferably closely approximates or achieves the desired performance criteria.

The detectable motion is preferably used to vary the sweeping frequencies in order to help optimize an average performance over the period of time it takes for the sweeping frequencies to complete one cycle. The detectable motion is also preferably used to help select which frequencies to use in the sweeping frequencies. The composition of the sweeping frequencies can be varied on a periodic basis, or using predetermined criteria in order to help optimize the average performance. Thus, the frequencies in the plurality of concatenated sweeping frequencies are preferably varied in response to movement of at least one of the motor and the driven element to produce an average performance of the motor and driven element for a time corresponding to the time for one sweep of frequencies, is greater than an actual performance of the driven element for the same period of time but when the actual performance is less than the desired performance.

Preferably, the desired performance criteria includes at least one of the speed of the driven element or motor, the force exerted by the motor on the driven element, the force exerted by the driven element, and the power consumed by the motor. The plurality of concatenated sweeping frequencies can be a continually increasing series of frequencies, a continually decreasing series of frequencies, or a variety of frequencies. The selected frequencies used to achieve a maximum performance will vary with the particular application, but are preferably sufficiently close to a resonant mode of the motor, driven element, or the combined motor and driven element so that the average performance is maximized and approximates the desired performance criteria. The combined period of the swept frequencies and the period of the individual frequencies within the swept frequencies can be varied to approximate or achieve the desired performance criteria.

Preferably, but optionally, the sweeping frequencies are varied periodically or according to some other criteria in order to maintain the average performance criteria at its desired value, and the desired value is usually as close to possible to the desired performance criteria. When the sweeping frequencies are varied, the varied sweeping frequencies preferably include at least one frequency which causes sufficient motion of one of the motor or driven element to be detected by a sensor, and feedback from that sensor can help to optimize the average performance as well help identify which frequencies may be best included within the sweeping frequencies.

There is also advantageously provided a method for controlling a piezoelectric motor in which the piezoelectric motor is configured to move a driven element when a sinusoidal electric signal of a first frequency is supplied to the piezoelectric motor with an amplitude that is sufficient to move a driven element a predetermined distance. The method includes selecting a predetermined first sequence of frequencies, where the first sequence of frequencies comprises at least two mutually different sinusoidal frequencies. Individual waveforms are created corresponding to each frequency of the first sequence of frequencies so that each individual waveform has a predetermined finite duration and amplitude and is periodic with a period that is the inverse of the corresponding frequency. The individual waveforms are concatenated into a single first electric signal and that first signal is supplied repeatedly to the piezoelectric motor to move the driven element. The selected first sequence of frequencies includes a sufficient number of frequencies that are distributed to cause the piezoelectric motor to move the driven element even when the properties of the piezoelectric motor change within a predictable range.

Thus, as the motor, driven element, signal source, or other components cause the performance to deviate from the desired performance criteria, the first sequence of frequencies provides a performance that, when averaged over the duration of the single first electric signal, preferably, but optionally, does not vary more than 30% when the properties of the piezoelectric motor change. Preferably, but optionally, the single first electric signal causes the piezoelectric motor to move the driven element with a varying performance.

Moreover, the method further advantageously, but optionally includes monitoring the motion of the driven element. The first sequence of frequencies is preferably further selected to include a sufficient number of frequencies that are distributed to cause the piezoelectric motor to move the driven element so that the motion of the driven element is maintained within a predetermined value as determined by the monitoring of the driven element. The monitoring advantageously, but optionally, uses a motion detector that provides a feedback signal when the motion of the driven element passes at least one selected threshold.

The feedback signal can be analyzed to determine an estimated frequency at which the piezoelectric motor can move the driven element when a sinusoidal electric signal of the estimated frequency is supplied to the piezoelectric motor. A second sequence of frequencies can be selected that preferably comprises at least the estimated frequency and one other frequency that is different from the estimated frequency to generate a second electric signal in accordance with the method of generating the first electric signal to cause the piezoelectric motor to move the driven element with an average performance that is higher than the average performance of the piezoelectric motor was before the estimated frequency was determined. The steps of analyzing the feedback signal and selecting a second sequence of frequencies can be repeated as often as needed to achieve a desired duration and distance of motion and a desired average performance. Advantageously, the second sequence of frequencies comprises at least one frequency that is smaller than the estimated frequency and at least one frequency that is larger than the estimated frequency.

The method also advantageously comprises analyzing the feedback signal to determine if the motion of the driven element has been less than a predetermined value for a predetermined amount of time. The second sequence of frequencies can be modified when the predetermined amount of time has passed so there is at least a difference between the largest and the smallest frequency of the sequence that is larger than the difference between the largest and the smallest frequency of the unmodified second sequence. These steps of analyzing the feedback signal and modifying the second sequence—until it is determined that the motion of the driven element is no longer less than the predetermined value for the predetermined amount of time—can be repeated as needed, preferably until the desired performance criteria is approximated as closely as is possible.

The above method preferably selects the first sequence of frequencies to cause the piezoelectric motor to move the driven element by a defined distance even if the properties of the piezoelectric motor change due to predictable causes. The method can further include supplying the electric signal a predetermined number of times per second in order to cause the piezoelectric motor to move the driven element at a defined speed. Moreover, any two consecutive frequencies advantageously each produce a piezoelectric motor performance comprising at least one of (the speed of the driven element, the motion of the driven element, and power consumption of the motor), with a performance difference between each of two said consecutive frequencies that is no more than a predetermined value.

In some embodiments, the frequencies are selected to cause the piezoelectric motor to produce a predetermined audible sound. This could have a variety of applications in various types of toys and entertainment applications.

In a further embodiment, the method includes selecting at least two sinusoidal frequencies that are mutually different to form a sequence of frequencies to cause the piezoelectric motor to move the driven element when individual waveforms corresponding to each frequency of the sequence of frequencies are concatenated to form an electric signal that is supplied repeatedly to the piezoelectric motor to move the driven element. Each of these individual waveforms has a predetermined finite duration and amplitude and are periodic with a period that is the inverse of the corresponding frequency. The at least two sinusoidal frequencies are selected to further cause the piezoelectric motor to move the driven element even if when the properties of the piezoelectric motor change within a predictable range. Deviating from the desired performance criteria a predetermined amount would be such a change.

In further variations of this further embodiment, the at least two frequencies are selected to cause the piezoelectric motor to move the driven element by a defined distance. Moreover, the duration of each of the individual waveforms can be selected to cause the piezoelectric motor to move the driven element with a defined speed. Still further, the at least two frequencies can each cause the piezoelectric motor to move the driven element with a different performance.

As with the above embodiments, this further embodiment can include monitoring the motion of the driven element and selecting the sequence of the at least two frequencies to further include a sufficient number of frequencies that are distributed to cause the piezoelectric motor to move the driven element so that the monitored motion of the driven element meets a predetermined criteria. Preferably, this further embodiment of the piezoelectric motor includes a motion detector providing a feedback signal when the motion of the driven element passes at least one selected threshold. The feedback signal can be analyzed to determine an estimated frequency at which the piezoelectric motor can move the driven element when a sinusoidal electric signal of the estimated frequency is supplied to the piezoelectric motor. The at least two frequencies are preferably selected to comprise the estimated frequency to cause the piezoelectric motor to move the driven element with an average performance that is higher than an average performance of the piezoelectric motor before the estimated frequency was determined.

Preferably, the piezoelectric motor of this further embodiment includes a motion detector providing a feedback signal when the motion of the driven element passes a selected threshold. Again, the feedback signal can be analyzed to determine if the motion of the driven element has been less than a predetermined movement for a predetermined amount of time. The sequence of the at least two frequencies can be modified when the predetermined amount of time has passed in order to cause at least a difference between the largest and the smallest frequency of the sequence that is larger than the difference between the largest and the smallest frequency of the unmodified sequence.

BRIEF DESCRIPTION OF THE DRAWINGS

These as well as other features of the present invention will become more apparent upon reference to the drawings, in which like numbers refer to like parts throughout, and in which.

DETAILED DESCRIPTION

Figure 4:
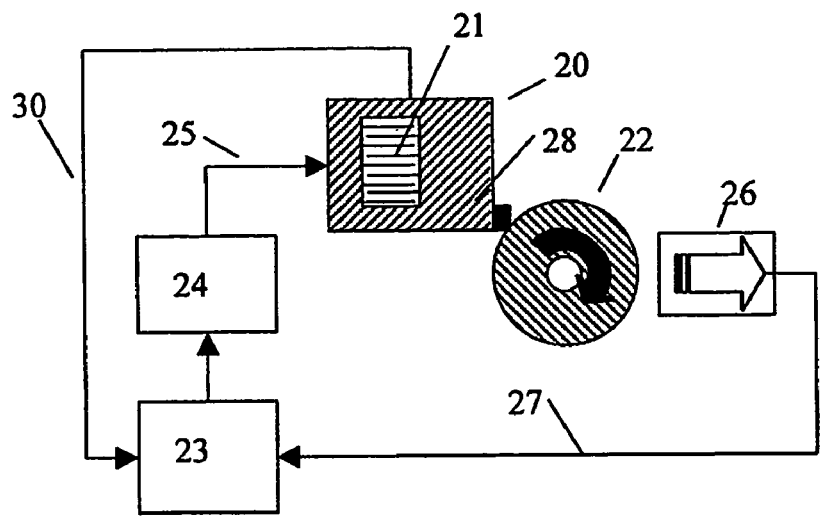
FIG. 4 is a block conceptual diagram with a feedback loop for a single-frequency piezoelectric motor that is in driving communication with a driven element.

Referring to FIG. 4, a piezoelectric motor 20 is provided and configured to be in driving contact with a driven element 22. The piezoelectric motor 20 is of the type that can be controlled to produce useful macroscopic motion of the driven element 22 by applying to the piezoelectric motor 20 a single electric signal 25 that is sinusoidal of a certain frequency. The term sinusoidal as used herein includes waveforms that are phase shifted, such as cosine waves. The range of frequencies for which useful motion is produced will be referred to herein as the range of operation. The range of operation is typically a coherent interval of frequencies within which the macroscopic motion of the driven element 22 occurs in the same direction. For the piezoelectric motors of the type discussed herein, the motion of the driven element 22 is understood to be a macroscopic motion of the driven element 22 that is the composite of a multitude of small displacements of the driven element 22, the small displacements being caused by the piezoelectric motor 20 and being substantially in the same direction. The bold arrow on the driven element 22 in FIG. 4 indicates a possible direction, but the opposing direction may also be possible. The driven element 22 is shown as a wheel, but other driven elements, such as rods, plates and balls may be used that provide further possibilities for directions of motions. A piezoelectric motor 20 may have several disjoint ranges of operation in which the driven element 22 moves in different directions. The macroscopic motion of the driven element 22 resulting from piezoelectric motor 20 operation is typically optimal with respect to some performance criterion at an optimal frequency within the range of operation. The performance criterion can vary, but typically includes one or more of the speed of the driven element 22, the force that the piezoelectric motor 20 generates, or a combination of the two, but the criteria may also include the electric power consumption. A typical piezoelectric motor 20 generally has a better performance if the same motion of the driven element 22 is achieved with less electric power consumption. Other performance criteria could apply. The optimal frequency and the boundaries of the range of operation of the piezoelectric motor 20 are expected to differ between any two piezoelectric motors of the same build due to design and manufacturing tolerances, material variations, etc. The piezoelectric motor 20 itself, and the materials used to make the piezoelectric motor 20 and any control circuitry associated therewith, are also expected to change over time due to wear, warming, aging, etc.

The block diagram in FIG. 4 further shows the piezoelectric motor 20 comprising one or more piezoelectric elements 21, which may be of the single—or multilayer type, and a mechanically resonating element 28. Further are shown means 24 of generating an electric signal 25 to be supplied to the one or more piezoelectric elements 21, and a controller 23 that controls the means 24. A wide variety of frequency generators, drivers and control circuits are known in the art, and a large number are commercially available for use as the signal generating means 24 and the controller 23. The controller 23 may or may not be supplied with a feedback signal 27 from a motion detecting device 26 that detects motion of the driven element 22 and/or with a feedback signal 30 that is obtained from the piezoelectric motor 20 or the associated electric components. For the control methods disclosed herein, the controller 23 operates principally in an open-loop fashion, but the controller 23 may intermittently use the feedback signals 27 and/or 30 to adapt its open-loop control strategy.

Figure 1:
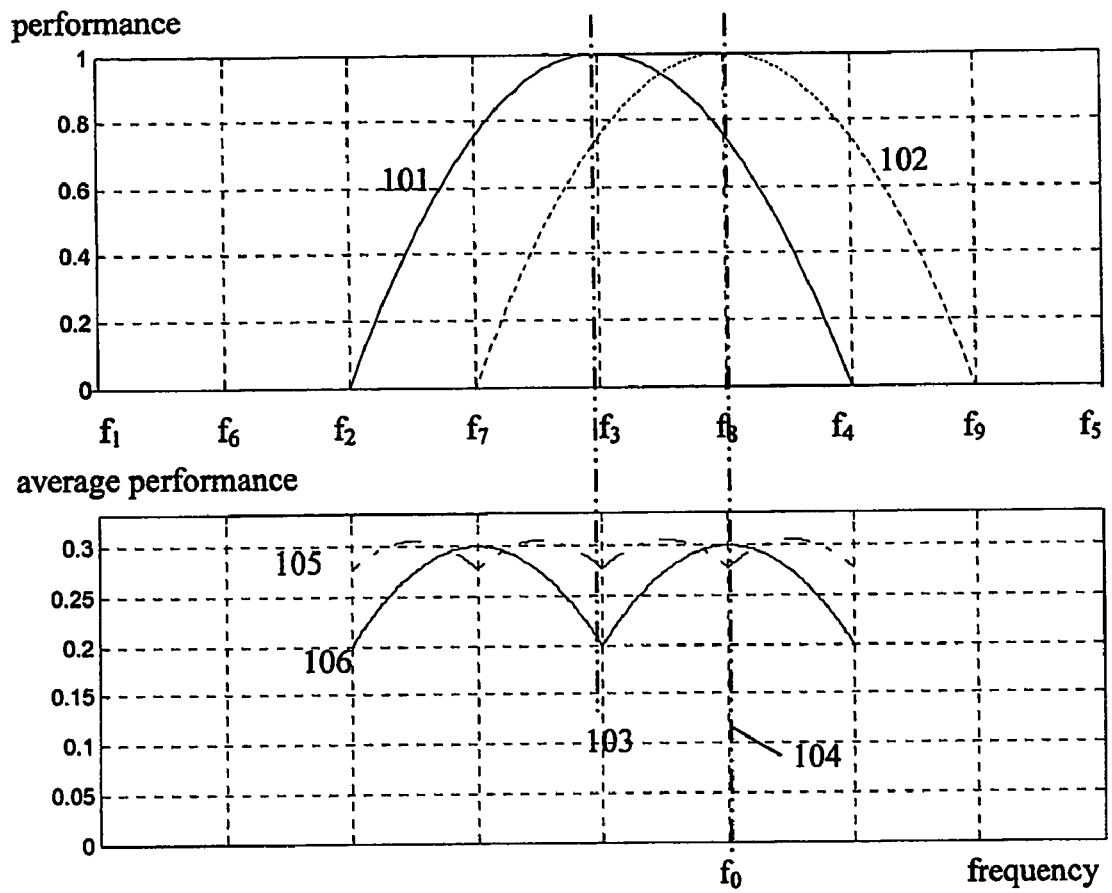
FIG. 1 is a graph showing piezoelectric motor performance versus frequency to illustrates the influence of sequences of frequencies on piezoelectric motor performance.

The performance of the piezoelectric motor 20 as measured by a selected performance criterion varies within the range of operation. The performance typically increases from the boundaries of the range of operation towards the optimal frequency. The general shape of a performance curve of a representative piezoelectric motor 20 at some point in time as a function of frequency is indicated in FIG. 1 by curve 102. The shape of the performance curve reflects how the performance depends on the excitation frequency $f_1$ to $f_5$ or any particular frequency $f_n$. The shape of the performance curve may also vary over time.

The preferred control methods employ predetermined sequences of non-zero frequencies for exciting the piezoelectric motor 20. The frequencies of a particular sequence are selected from a control range of frequencies, where the control range usually includes at least the aforementioned range of operation, so that the sequence comprises at least one frequency from the range of operation. In a sequence of frequencies, at least two frequencies are mutually different, meaning that they have a different frequency rather than the same frequency with different durations of associated waveforms, said waveforms being explained below. For example, mutually exclusive frequencies would not include two or more sequential signals each having the same frequency but different for durations of time. Mutually exclusive frequencies would include two sequential signals each having a frequency that differed from the other by only a few hertz but were of the same duration, or even of different durations.

To generate an electric signal 25 for controlling the piezoelectric motor 20 using means of controlling 23 from such a sequence of frequencies, first a waveform is created for each frequency of the sequence, each waveform having a predetermined finite duration and amplitude, and each waveform further being periodic with a period that is the inverse of the corresponding frequency. Said predetermined finite duration is understood to be at least as long as one period of the corresponding waveform. The waveforms are then linked together in sequence (concatenated) in order to compose the electric signal 25 using appropriate electronic means 24.

For example, if $\{f_1, f_2, f_3\}$ is a predetermined sequence of frequencies, then $\{w_1, w_2, w_3\}$ constitutes the electric signal wherein $w_1$, $w_2$, and $w_3$ are periodic waveforms with periods $1/f_1$, $1/f_2$, $1/f_3$, each waveform having a duration of $T_1$, $T_2$, $T_3$ and an amplitude $A_1$, $A_2$, $A_3$, respectively. Useful periodic waveforms are the sinusoidal (harmonic), triangular (saw tooth), rectangular (digital) waveform. This list is non-exhaustive.

Waveforms can be generated by changing the phase of another waveform. For example, a cosine is a sine with a 90-degree phase shift. A sequence, or, equivalently, the corresponding electric signal 25, can be repeated as often as needed. A further example of a sequence that can be used in the proposed method is the periodic frequency sweep. In such a sweep, the sequence consists of frequencies that are monotonically increasing, or decreasing, between the two boundaries of the control range.

The sequences are preferably predetermined or random but within a predetermined distribution. Appropriate sequences include periodically repeated sweeps from low to high frequencies (up-sweeps) or from high to low frequencies (down-sweeps), or oscillating sweeps (an up-sweep followed by a down-sweep, and so on). When the electric signal 25 is supplied to the piezoelectric motor 20, the average piezoelectric motor 20 performance, i.e., the average speed or driving force it is generating in the driven element 22, for instance, a combination of the two, or the electric power consumption, can be regulated by appropriately choosing the frequency distribution of the corresponding sequence, for example, by selecting a starting and ending frequency for a sweep.

The speed in which a sequence is executed depends on the durations of the waveforms of the corresponding electric signal 25. The speed in which a sequence can be executed can also be used to further adjust piezoelectric motor 20 performance and influence acoustical noise generation. Acoustical noise in the form of a clicking or similar sound may occur, for example, when the sequence of frequencies corresponding to the electric signal 25 supplied to the piezoelectric motor 20 comprises two frequencies $g_1$ and $g_2$, $g_2$ either immediately following $g_1$ in the sequence or immediately preceding it, $g_1$ being close to the optimal frequency and $g_2$ being in the non-operational range. A frequency $g_1$ follows $g_2$ if $g_1$ is at the beginning of the sequence and $g_2$ is at the end of the sequence and vice versa. Depending on how often the transition from $g_1$ to $g_2$, or vice versa, occurs per second, i.e., depending on the frequency of transitions, different acoustical noise may be generated.

A frequency of transitions in the order of 2 kHz is believed to create a noise level that is perceived as particularly unpleasant to human hearing compared to other frequencies given the same sound volume. By increasing of decreasing the frequency of transitions, e.g., by increasing or decreasing the durations of the waveforms that have the frequencies $g_1$ and $g_2$, the noise is not eliminated but can be shifted in frequency to a range that is less disturbing to the human hearing, to animal hearing, or possibly to sound sensitive equipment. Alternatively, this sort of noise generation can be minimized or eliminated by avoiding or limiting said transitions altogether. This can be achieved by requiring that any two consecutive frequencies of a sequence produce a piezoelectric motor 20 performance with a performance difference or change that is no more than a predetermined value as measured by the selected performance criterion when an electric signal 25 that is sinusoidal of either of these frequencies is supplied to the piezoelectric motor 20.

It is possible to further select sequences of frequencies for controlling a piezoelectric motor 20 to purposefully generate an audible sound from the piezoelectric motor 20. In addition, and as a further example, periodic interruptions of the driver signal 25 at appropriate times can generate audible noise if the frequency of the interruption lies in the audible range of living creatures, including humans, animals, fish, reptiles or insects. The audible range is typically between about 20 Hz to about 18,000 Hz for humans, but will vary with age. This intentional generation of driving noise can be used to simulate engine sounds in toys, or to generate other noises that have application for toys or other uses. The speed and noise of the piezoelectric motor 20 can further be controlled by modulating the amplitude or the waveform of the driving signal 25. The methods can be used alone or in combination. There is thus provided means for using a piezoelectric motor 20 to generate useful motion and/or audible signals having use in specific applications such as toys or other areas where audible signals are used.

The duration of a waveform from a corresponding sequence of frequencies is a very useful design factor. For example, if a sequence repeatedly toggles between a first nearly optimal frequency and a second frequency that lies outside the range of operation then the resulting motion of the driven element 22 is principally a stop-and-go motion. This stop-and-go motion is clearly noticeable if the durations of the waveforms corresponding to said sequence are very long, e.g., several seconds. However, the stop-and-go motion may also be present if said durations are extremely short, e.g., only a few times the inverse of one of the said first or the second frequency. This is due to the extreme responsiveness of piezoelectric motors. In other words, piezoelectric motors have typically extremely short transients. If the stop-and-go motion is faster than the human eye can perceive, for example approximately faster than about 25 Hz stop-and-go cycles per second, the resulting motion of the driven element 22 appears smooth to the unaided human eye. Depending on the number of stop-and-go cycles per second, the resulting motion may also appear smooth to the human touch, or smooth with respect to other measures. In this sense, the term 'smooth' reflects an average motion quality of the driven element 22.

As used herein, uniformly increasing or decreasing the durations of the waveforms for a sequence of frequencies will here be referred to as executing the sequence faster or slower.

There is thus provided an averaging effect in which the macroscopic motion of the driven element 22 appears smooth with an average performance that is less than the piezoelectric motor 20 performance at the optimal frequency if a sequence of frequencies is executed sufficiently fast and if it contains sufficiently many frequencies inside the range of operation.

A motion of the driven element 22 caused by the piezoelectric motor 20 is considered smooth if the piezoelectric motor 20 performance fluctuations during the execution of a sequence of frequencies cannot be perceived by means and criteria of observing or monitoring the driven element 22 as set forth by a particular application. In other words, a motion of the driven element 22 is considered smooth if said monitoring means and criteria cannot tell that there are indeed piezoelectric motor 20 performance fluctuations occurring. For example, in a toy it may be sufficient for piezoelectric motor 20 performance fluctuations to occur at a rate that is faster than approximately 25 Hz in order for the motion of the driven element 22 to be perceived as being smooth if the monitoring is performed by an average human observer. Other rates may apply if the motion is supposed to appear smooth to a non-human observer, such as a pet animal. Likewise smooth motion could be identified by a smooth and continuous sound produced by piezoelectric motor 20 operation as perceived by a human ear, which may differ from what a dog or cat perceives. In still other applications, the smoothness criteria may be based on performance criteria monitored by instruments. Thus, the smoothness of the driven element 22 motion could also be monitored by electric instruments such as optical sensors, motions detectors, or other instruments that sense some parameter resulting from motion of the piezoelectric element 20 or the driven element 22. For example, in some applications it may be required that the motion of the driven element 22 is perceived as being smooth, i.e., free of fluctuations, when means of observing the motion of the driven element 22 is the human or non-human touch. A motion may also be determined as smooth or sufficiently smooth by indirect means. For example, the driven element may itself be connected to other elements or supports that may be monitored for vibrations or similar to determine a smoothness of motion. A sequence of frequencies is thus considered being executed sufficiently fast and containing sufficiently many frequencies inside the range of operation if the resulting driven element motion 22 is perceived smooth by monitoring means and criteria of observing the driven element 22 as set forth by the particular application.

The control range of frequencies usually is selected to include a frequency at which the piezoelectric motor 20 produces a responsive motion or signal with a desired characteristic such as amplitude, frequency, or phase. If the control range of frequencies is selected sufficiently large, it should always contain the range of operation even if the range of operation shifts due to predictable and unpredictable variations in the piezoelectric motor 20 operation attributable to manufacturing and production tolerances and further attributable to performance changes and degradation of the piezoelectric motor 20 and associated electronic components. Furthermore, the range of operation should also be contained in the control range even if the electronic circuit 24 that generates the electric signal 25 and supplies it to the piezoelectric motor 20 is inexact because of changes attributable to manufacturing and production tolerances and further attributable to performance changes and degradation of the associated electronic components. Therefore, if a sequence of frequencies is selected so that the frequencies of the sequence are sufficiently dense within the control range, then the aforementioned averaging effect can produce a piezoelectric motor performance that varies typically by less than 30% preferably less than 20%, even more preferable by less than 10% and better even by less than 5% when the properties of the piezoelectric motor 20 change within a predictable range. Concurrently, it can also be advantageous to desire a performance variation that is more than 5%, 10%, 20%, or even 30%. A relatively constant performance can thus be achieved without the need of feedback control.

The term 'sufficiently dense' as used here is illustrated schematically with reference to FIG. 1, which shows performance vs. frequency graphs. The maximal achievable performance on the vertical axis is labeled 1, 1 being equal 100%. In FIG. 1, curve 101 illustrates an idealized piezoelectric motor 20 performance as the excitation frequency changes. Curve 101 serves as a reference curve for selecting an appropriate sequence of frequencies and is typically measured under standardized conditions for a representative group of one or more piezoelectric motors that are representative of an entire group of piezoelectric motors of the same design and manufacture. Said entire group may, for example, comprise one day of the production volume of a manufacturing plant producing the piezoelectric motors 20. The curve 101 may be computed as the average of all performance curves of the representative group of piezoelectric motors, or it may be computed as the minimal performance that each piezoelectric motor of the representative group is able to deliver under said standardized conditions. Other computation methods for the curve 101 may be useful as well. Curve 102 illustrates the piezoelectric motor performance curve of a particular piezoelectric motor 20 from the entire group of piezoelectric motors at a given time. Curve 102 is usually not explicitly measured or known. Due to the always present piezoelectric motor parameter fluctuations, curves 101 and 102 usually do not coincide. Furthermore, curve 102 varies with time. The optimal frequency of curve 101 is marked by a vertical line 103 that is fixed. The optimal frequency of curve 102 is labeled with $f_0$ and is marked by a vertical line 104, both of which move with the curve 102 as the curve 102 varies with time.

For illustrative purposes, a first sequence of frequencies, $\{f_1, f_2, f_3, f_4, f_5\}$, comprising five equally-spaced frequencies is selected. The sequence is repeated as often as needed to achieve a desired total duration of piezoelectric motor 20 operation. In this example, each frequency of the first sequence of frequencies is executed with an equal duration. The total piezoelectric motor 20 performance averaged over the total duration of piezoelectric motor 20 operation for the first sequence of frequencies is approximately one fifth of the sum of the values of the curve 102 at the five frequencies of the sequence. Said total piezoelectric motor 20 performance varies with the curve 102, i.e. with the location of curve 104 or, equivalently, with the frequency $f_0$. The varying total piezoelectric motor 20 performance as a function of the frequency $f_0$ is graphed by curve 106. As shown, the performance reaches a maximum value of approximately 0.3, this value being less than the maximum value of 1.0 of curve 102. Curve 106 fluctuates between 0.2 and 0.3. In other words, if the piezoelectric motor 20 changes its properties due to temperature, etc., and the curve 102 consequently moves in between the frequencies $f_1$ and $f_5$ to a unknown position, then executing the sequence of frequencies $\{f_1, f_2, f_3, f_4, f_5\}$ ensures that the total piezoelectric 20 motor performance remains within the range 0.25+/−0.05, i.e., that it remains 0.05/0.25=20% constant.

For the purpose of comparing total piezoelectric 20 motor performances, the same procedure is now repeated for an exemplary second sequence of frequencies, $\{f_1, f_2, f_3, f_4, f_5, f_6, f_7, f_8, f_9\}$, comprising nine equally-spaced frequencies. The total piezoelectric motor 20 performance averaged over the total duration of piezoelectric motor 20 operation for the second sequence of frequencies is approximately one ninth of the sum of the values of the curve 102 at the nine frequencies of the sequence. The varying total piezoelectric motor 20 performance as a function of the frequency $f_0$ is shown by curve 105. The variation of curve 105 is approximately 0.29+/0.01, i.e., the curve is constant within 0.01/0.29=3.5%. Curves 105 and 106 have the same maxima, but curve 105 has a smaller range of variation and a higher mean. The second sequence of frequencies, which is denser than the first sequence of frequencies by having more frequencies within the same bandwidth, the bandwidth of both the first and the second sequences of frequencies being the difference $(f_5-f_1)$, is therefore more robust with respect to variations of the parameters of the piezoelectric motor 20 and associated components. For example, the second sequence of frequencies would be considered sufficiently dense if a piezoelectric motor 20 performance was required that remains better than, say, 10% constant and that is above, say, 0.25.

By sweeping the frequencies within the range of operation, an excitation signal 25 to the piezoelectric motor 20 is provided that preferably always encompasses the optimum performance of the piezoelectric motor 20. While a portion of the frequencies are less than optimal, the range of operation frequencies is advantageously close enough to the frequency corresponding to the optimum performance of the motor 20 so that the overall performance of the piezoelectric motor 20 is likely to be greater than if no swept frequency is provided. This occurs because the performance of a piezoelectric motor is typically very high for a range of frequencies on either side of the optimal frequency, and by sweeping those frequencies an averaged performance is achieved that is likely to be higher than will occur if a single fixed excitation frequency is selected and provided without prior knowledge of curve 102. This increased performance by sweeping a control range of frequencies also allows continued high performance when the piezoelectric motor 20 gets hot, ages, or otherwise undergoes a change that causes the optimal frequency to change. There is thus provided an open-loop control method that can produce steady performance of piezoelectric motor 20 independently of parameter fluctuations of a piezoelectric motor 20.

The use of sequences of frequencies to drive the piezoelectric motor 20 can provide a number of other advantages and uses. The order of the frequencies in a sequence may be re-arranged to satisfy other conditions. For example, the aforementioned sequence $\{f_1 \ldots f_9\}$ may be understood as the composition of two up-sweeps. The same sequence written as $\{f_1, f_6, f_2, f_7, f_3, f_8, f_4, f_9, f_5\}$ is a smooth up-sweep that has advantageously small frequency steps but one large frequency jump from $f_5$ to $f_1$ in between repetitions. The same sequence written as $\{f_1, f_2, f_3, f_4, f_5, f_6, f_7, f_8, f_7, f_6\}$ is an overall smooth composition of an up-sweep with a down-sweep, which can be advantageous in applications where frequency jumps may lead to undesired audible noises. In this context, it should be noted that a monotonous sequence with many closely spaced frequencies allows the piezoelectric motor 20 to closely track curve 102 even when shifted. Each such sweep causes the piezoelectric motor 20 to execute a well-defined step of the driven element 22 which is related to the area under the curves 101 or 102. If the sweep can be executed repeatedly and sufficiently fast, the individual steps blend together into what appears to be a smooth motion of the driven element 22 in the sense that monitoring means and criteria set forth by an application cannot tell that the motion is indeed composed of many individual and distinct steps. The speed of said smooth motion is given by the product of the step size and the number of repetitions per second. As discussed above, the criteria for determining what constitutes "smooth" motion will vary with the particular application, and the frequencies are repeatedly executed sufficiently fast to achieve the required smoothness of motion.

There is thus provided an open-loop control method that produces defined step sizes of the driven element 22 at a steady rate independently of parameter fluctuations of a piezoelectric motor 20.

In addition to executing a sweep or any other sequence, the piezoelectric motor 20 can be further slowed down by periodically, or non-periodically, turning it on and off, e.g., by interrupting the electric driver signal 25 to the piezoelectric motor 20 at pre-determined times for pre-determined amounts of time. For a sweep, a preferable moment to interrupt the electric signal 25 is when the sweep has reached its end and before it recommences. If the first and the last frequency of a sweep both lie outside the range of operation, the piezoelectric motor 20 has stopped anyway at this time. The signal interruption therefore should not produce an audible sound. The execution of a sequence of frequencies may also be interrupted if, for example, the driven element has reached a predetermined destination, or if the current sequence of frequencies does not provide the desired piezoelectric motor 20 performance. In the latter case, a sequence of frequencies may be modified or be replaced by a more appropriate sequence of frequencies using a feedback method as discussed later.

The rate of change of a frequency sweep, the rate of change given by the durations of the associated waveforms, does not need to be constant. Indeed, if possible, it is advantageous to sweep slowly where it is known or estimated that the piezoelectric motor 20 goes through a transition from not operational to operational in order to reduce or eliminate audible noise, which is typically generated when the piezoelectric motor 20 is abruptly set in operation, or abruptly stops operation. It is thus preferable to slow the rate of sweep, or to increase the duration of the associated waveform, so that as the transition of the piezoelectric motor 20 from an operational to non-operational mode does either not produce an audible sound or produce a predetermined audible sound. This variation in the rate of sweep or variation in the duration of the associated waveform can also be used to meet other criteria at the desired transition point. One example would be to produce a sound at a predetermined volume or amplitude, or to generate a predetermined signal that may vary with the use to which the motor 20 is put.

Figure 5:
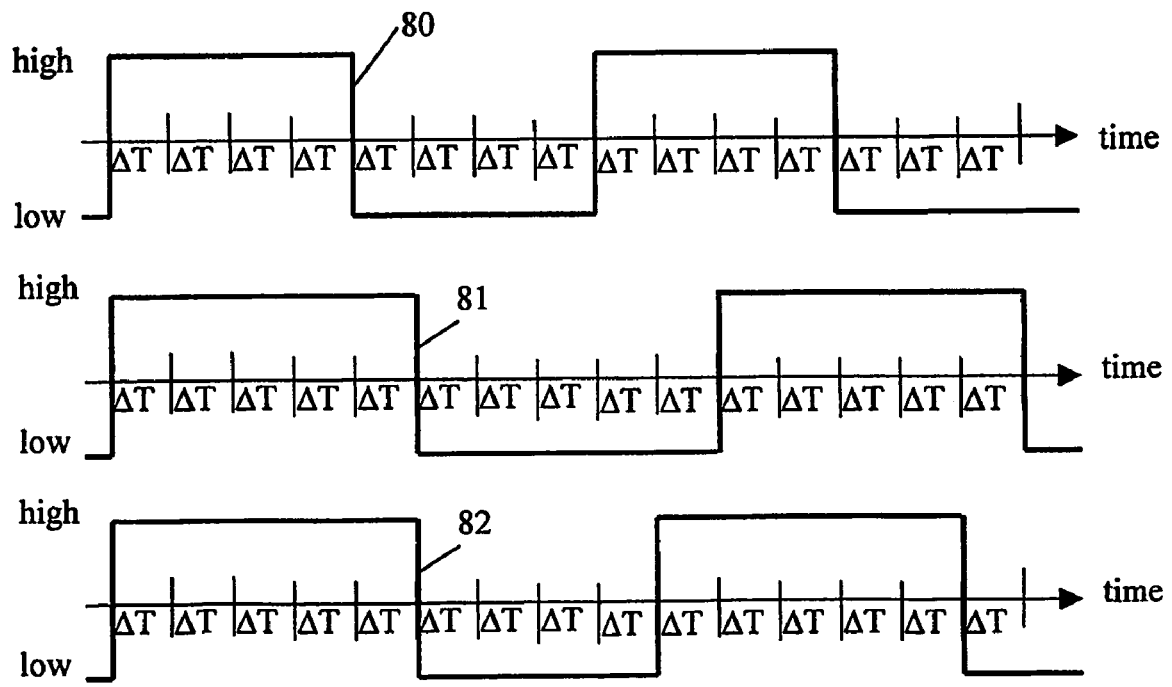
FIG. 5 shows several digital signals.

A sequence of discrete frequencies is suitable for means of signal generation 23 that are digital where the signal waveforms are rectangular, or digital, as opposed to being sinusoidal. Digital signal generation 23 can be achieved, for example, with an appropriately programmed microcontroller, or with a pulse-width modulation (PWM) unit, which is often comprised in a microcontroller. Digital signal generators are limited by the fact that the time resolution of the generated signal is the product of a signal generator specific time constant and an integer. Strictly periodic signals are therefore only possible at certain discrete frequencies. This property of digital signal generation is explained referring to FIG. 5. In this figure, the time resolution of a digital signal generator 23 is given by a constant $\Delta T$. A first strictly periodic signal is one that, for example, repeatedly is high for a period of $4\Delta T$ and low for an equal period as in digital signal 80. The base frequency of digital signal 80 is thus $1/(8\Delta T)$. A second strictly periodic signal with base frequency $1/(10\Delta T)$ is digital signal 81, which has low and high periods of $5\Delta T$. A third strictly periodic signal with base frequency $1/(9\Delta T)$ is digital signal 82, which has low periods of $5\Delta T$ and high periods of $4\Delta T$. The base frequency of a strictly periodic signal is thus $1/(N\Delta T)$, where N is a positive integer. This is a limiting factor in selecting sequences of frequencies and can further be a limiting factor in achieving constant piezoelectric motor 20 performance as can be understood from the previous discussion of FIG. 1 and the differences in performance caused by the previously discussed sequences $\{f_1 \ldots f_9\}$ and $\{f_1 \ldots f_5\}$. In other words, if the frequency resolution of the digital signal generator is poor with respect to the width of the range of operation, the resulting piezoelectric motor 20 performance may be less robust with respect to changes of piezoelectric motor 20 parameters such as temperature, etc.

Fast switching between adjacent frequencies, for example between $1/(N\Delta T)$ and $1/((N+1)\Delta T)$, provides a method to operate a piezoelectric motor 20 at frequencies that a digital signal generator cannot readily generate in a pure form. In this method, a sequence of frequencies $\{F_1, F_2, F_1, F_2 \ldots\}$ is composed of two adjacent frequencies $F_1$ and $F_2$ in repeated pairs that the digital signal generator can readily generate in a pure form. It was previously discussed that if each of $F_1$ and $F_2$ is executed for a relatively long duration, then the piezoelectric motor 20 performance toggles between the performances corresponding to frequencies $F_1$ and $F_2$. However, if the switching occurs fast, i.e., if the duration for which each of $F_1$ and $F_2$ is executed is smaller than the decay time for piezoelectric motor 20 transients, then the piezoelectric motor 20 performance is not given time to settle into either performance, but instead the piezoelectric motor 20 can be viewed as being presented with a signal 25 that has a principal frequency content $F_3$ that lies in between $F_1$ and $F_2$. The exact location of $F_3$ depends on the ratio of the durations for which $F_1$ and $F_2$ are individually excited and may be determined with a standard mathematical tool known as Fourier analysis. For example, if each of $F_1$ and $F_2$ is excited for the same duration, representing a duration ratio of 1:1, then $F_3$ lies in the middle between $F_1$ and $F_2$. In principle, any other frequencies $F_3$ can be approximated sufficiently close using other duration ratios. Realistically however, the duration ratios are limited by the duration of the piezoelectric motor 20 transients and the time resolution of the digital signal generator 23. Piezoelectric motor 20 are generally very responsive and can have transients that are as short as four or five vibration periods.

For example, if the mechanical piezoelectric motor 20 transients occur within 4 oscillation periods, then the duration for which each of $F_1$ and $F_2$ is applied for should be less or equal than those 4 oscillation periods. If the durations are selected to be convenient integer multiples of the vibration periods, then the duration ratios in this example are approximately 1:1, 1:2, 1:3, 1:4, 2:1, 2:3, 3:1, 3:2, 3:4, 4:1, and 4:3, giving rise to an equal number of frequencies $F_3$ that lie between $F_1$ and $F_2$. The said duration ratios are approximate in the sense that in a preferred application of the method, the duration for which a frequency is applied is advantageously an integer multiple of the period of that frequency. In particular, four periods of two adjacent frequencies have nearly, but not exactly, the same duration. It is advantageous to use said integer multiples of vibration periods to avoid sudden signal 25 jumps and possibly resulting jarring noises of the piezoelectric motor 20, but durations do not need to be integer multiples. It can also be convenient to use durations that are integer multiples of one half of a period.

There is thus provided means for achieving usable operation from a piezoelectric motor 20, even if the optimal operational frequency of that piezoelectric motor 20 has changed, by using means of digital signal generation 23 to provide a sequence of frequencies to the piezoelectric motor 20 at predetermined intervals within a frequency range sufficient to cause the piezoelectric motor 20 to operate less than optimally but reliably. The sequence of frequencies may contain sub-sequences of frequencies that the digital signal generator 23 can generate in a pure form, but that are each of a duration that is shorter than the typical duration of a piezoelectric motor 20 transient, for the purpose of operating the piezoelectric motor 20 at frequencies that the digital signal generator 23 cannot generate in a pure form.

The proposed control methods can be augmented and improved by an appropriate feedback mechanism by which any piezoelectric motor 20 operation (optimal or not) is detected. Several different methods can be used. The fact that the piezoelectric motor 20 is operating, i.e., that it is adequately moving a driven element 22, can in some instances be derived from an electric response 30 of the piezoelectric motor 20, e.g., from a phase shift between voltage and current, or from an increase/decrease in current consumption, or from an increase/decrease of voltage at the piezoelectric element. Further sources of feedback information 27 are single or combinations of sensors 26 that detect motion of the driven element directly, such as Hall sensors or light barriers, or also force sensors. A Hall sensor or a light barrier can be used to provide impulses every time the driven element has moved a defined distance and/or passed selected thresholds. Distance may be measured as length for a linearly moving driven element, or as angle for rotating driven elements such as wheels. Counting the number of impulses during a determined period of time can provide a measure of speed of the driven element 22.

In another example, a piezoelectric motor 20 comprises an electrically conductive resonator 28 that is in driving contact with an electrically conductive driven element 22. Measuring the electric resistance between the resonator 28 and the driven element 22 may provide the desired feedback 30 in a piezoelectric motor 20 where the resonator intermittently lifts off partially or completely from the driven element 22 during piezoelectric motor 20 operation. The electric feedback signal 30 in these cases may be discrete due to complete liftoff or analog due to partial liftoff and/or change in contact pressure. In a preferred embodiment of the invention, one of the resonator 28 or the driven element 22 is made of a semi-conductive material, such as plastic containing carbon particles or fibers. In this embodiment, an analog signal representing electric resistance can be used to provide feedback 30 as to the frequencies at which the piezoelectric motor 20 operates and at which frequency the piezoelectric motor 20 operates in an optimal sense.

For a particular piezoelectric motor 20, analyzing the feedback signal 30 and/or 27 from a single or combinations of sensors 26 at an excitation frequency, and deriving a numeric performance criterion describing the piezoelectric motor 20 performance such as speed or force at that frequency using appropriate electronics and algorithms in a controller 23 constitutes a feedback method. If an electric signal 25 comprising a single, slow, continuous frequency sweep is supplied to the piezoelectric motor 20, then the performance criterion traces a performance curve as a function of the momentary excitation frequency.

Figure 2:
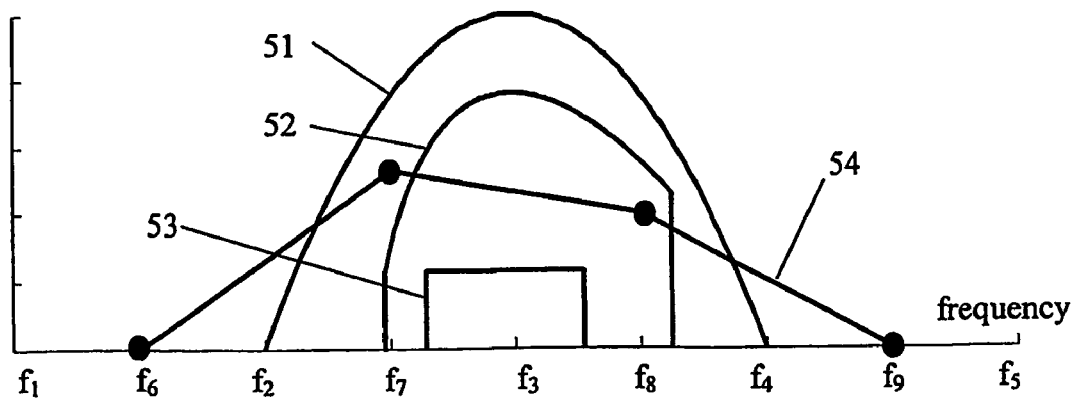
FIG. 2 illustrates typical performance curves obtained by feedback.

Typical curves that may be obtained are illustrated in FIG. 2. Curve 51 is representative of a feedback method that provides continuous information about piezoelectric motor 20 performance. Curve 52 is representative of a feedback method that has a minimal motion threshold and/or is hysteretic and thus provides discontinuous information about piezoelectric motor 20 performance. Curve 53 is representative of a feedback method that provides only information about the presence of a motion with at least a minimal piezoelectric motor 20 performance. If a performance curve of the type of curve 51 or 52 is measured, an optimal frequency of operation may be determined at the maximum of the performance curve. If a performance curve of the type of curve 53 is measured, an optimal frequency of operation can only be estimated, for example at the horizontal center of the rectangular-shaped portion of curve 53.

Piezoelectric motor 20 performance curves may be different for continuous sweeps from low frequencies to high frequencies and vice versa.

Curves such as curves 51–53 may provide, in part, a way or the means to determine a performance curve 102. A curve 102 may be selected to coincide with one of curves 51–53, or additional information, for example from a feedback signal 30, may me incorporated to compute a curve 102. As previously discussed, an idealized performance curve 101 may be derived from the curves 102 that have been obtained under standardized conditions for many piezoelectric motors 20.

Approximations to curves such as curves 51–53 are obtained by using sequences of frequencies to generate the electric signal 25 supplied to the piezoelectric motor 20 instead of the continuous frequency sweep. For example, a curve such as exemplary curve 54 may be obtained by using a sequence of frequencies $\{f_6, f_7, f_8, f_9\}$, analyzing the feedback signal 27 at each of these frequencies, and plotting the resulting piezoelectric motor 20 performances as dots connected by, for example, straight lines.

When operating a piezoelectric motor 20 with a sequence of frequencies to cause the piezoelectric motor 20 to move a driven element, then the feedback method provides information about the piezoelectric motor 20 performance while each frequency of the sequence is executed. As previously mentioned, piezoelectric motor 20 are extremely responsive (as opposed to, say, DC electromagnetic motors with high inertia). The information that is obtained with a feedback method therefore tracks the timing of the execution of the sequence of frequencies with a delay of only a few vibration periods, provided that the delay in the feedback loop is sufficiently small. There is thus provided a method to execute a sequence of frequencies covering at least the range of operation of a piezoelectric motor 20 to move a driven element, and to simultaneously use a feedback method to identify the piezoelectric motor 20 behavior, which changes over time, and to repeat an appropriate sequence advantageously within less than approximately ¹⁄₂₀ of a second to make the resulting motion of the driven element appear sufficiently smooth to the human eye, or to repeat the sequence faster if a smoother motion of the driven element 22 is required, or to repeat the sequence slower if an appropriate performance and smoothness of motion may so be achieved. The feedback information 27 and/or 30 can further be used to modify the sequence of frequencies to more closely track the changing range of operation of the piezoelectric motor 20.

Figure 3:
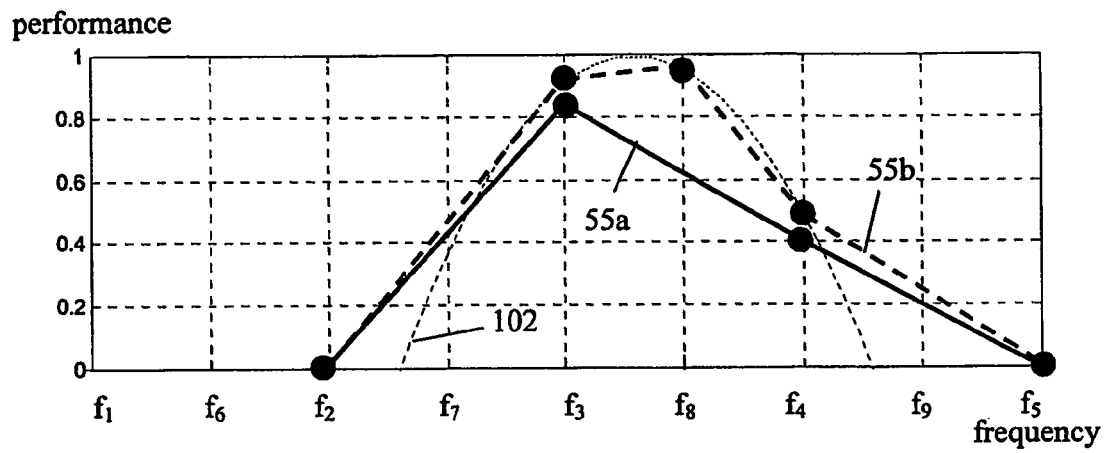
FIG. 3 illustrates a feedback control method.
Figure 3:
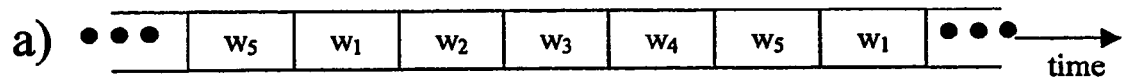
Figure 3:
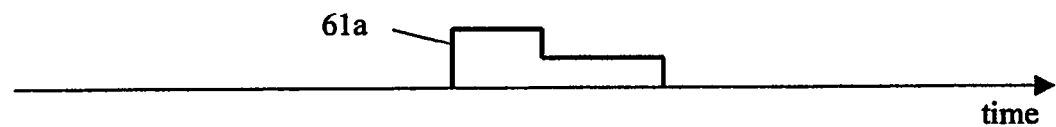
Figure 3:
Figure 3:
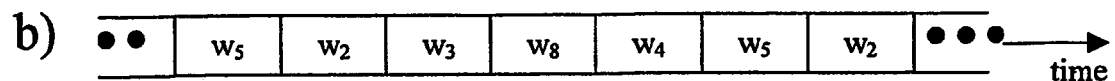
Figure 3:
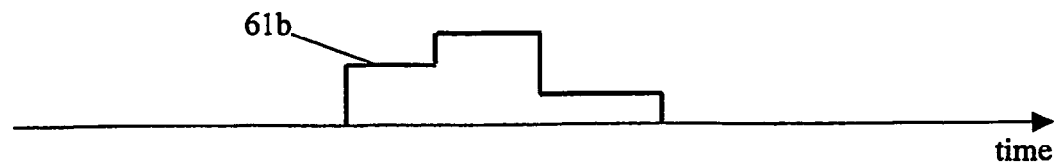
Figure 3:

The feedback method can be used to intermittently adapt a sequence of frequencies to cause the piezoelectric motor 20 to move the driven element 22 with an improved performance even if the properties of the piezoelectric motor 20 have changed due to temperature, aging, or other reasons. The procedure is illustrated with reference to the examples in FIG. 3. FIG. 3 shows an hypothetical performance curve 102 that a piezoelectric motor 20 may have at a particular point in time. In a first example of intermittently adapting a sequence of frequencies, a first sequence of frequencies $\{f_1, f_2, f_3, f_4, f_5\}$ gives rise to waveforms $w_1$–$w_5$, which are supplied repeatedly to the piezoelectric motor 20 in the sequence shown. During execution of the first sequence of frequencies, a feedback method may provide a performance reading as a function of time such as the exemplary curve 61a. From curve 61a, the curve 102 can be estimated by graphing the measured values as vertices over the current excitation frequency and connecting the vertices with straight lines, such as done in curve 55a. Note that the vertices of curve 55a or other such curves that estimate a curve 102 do not necessarily lie on the hypothetical curve 102 due to, in part, measurement errors, etc. From the curve 55a, one can estimate that the frequency $f_1$ is far from the range of operation, and that the curve 102 has a maximum that is likely located in the vicinity of $f_8$. While these examples refer to graphing and show various graphical images, the generation of these graphs is mathematically based and thus the analysis can be entirely executed by appropriate software using a computer or appropriate integrated circuits or other electronic systems. This applies to the above, and following graphs which are used to illustrate the principles of the described motor control.

One may use this information to determine, for example, a second sequence of frequencies $\{f_2, f_3, f_8, f_4, f_5\}$, which when executed would give rise to a performance reading as a function of time similar to curve 61b, and in the process to an estimate to curve 102 in the form of curve 55b. Clearly, the second sequence of frequencies causes the piezoelectric motor 20 to move the driven element 22 with an improved performance since it has more frequencies within the range of operation and also a narrower bandwidth than the first sequence of frequencies, the bandwidth being defined as the difference between the largest and the smallest of the frequencies of a sequence. In addition, since the second sequence of frequencies covers the range of operation of the piezoelectric motor 20, the piezoelectric motor can be reliably operated even if the range of operation, and therefore the curve 102, should shift by a small amount.

In a second example of intermittently adapting a sequence of frequencies, the feedback method is assumed to generate pulses when the driven element 22 has moved by a sufficient distance. If, for example, a first sequence $\{f_1, f_2, f_3, f_4, f_5\}$ is repeatedly executed as done in the previous example, then a performance reading as a function of time such as curve 62a may be obtained. Curve 62a illustrates that impulses are likely to occur in faster succession the closer the frequency at which the piezoelectric motor 20 is being excited is to the optimal frequency. The density of the impulse distribution in curve 62a can then be used to graph a curve similar to curve 55a. Based on curve 55a, a second sequence of frequencies may be selected to cause the piezoelectric motor 20 to move the driven element 22 with a better performance and an adequate robustness towards piezoelectric motor 20 parameter changes when the second sequence of frequencies is executed. A possible second sequence of frequencies is $\{f_2, f_3, f_8, f_4, f_5\}$. In another method, only the first occurrence of an impulse is used to determine a likely operational frequency. In the exemplary curve 62a, the first impulse occurs while $f_3$ is being supplied to the piezoelectric motor 20. Based on this information a second sequence of frequencies may be selected such as $\{f_2, f_3, f_8, f_4, f_5\}$, which may cause a performance reading in function of time such as curve 62b with an associated estimate of curve 102 given by, for example, curve 55b. The second sequence of frequencies has a more narrow bandwidth than the first sequence and causes the piezoelectric motor 20 to operate with a better performance while maintaining a certain robustness towards changes of piezoelectric motor 20 properties. This method is particularly useful in embodiments where it can be assumed that the piezoelectric motor 20 is most likely to trigger a response of the sensor 26 when the piezoelectric motor 20 causes the driven element 22 to move with a performance that is close to optimal. In all of the above methods, the second sequence of frequencies can be further modified or replaced with subsequent sequences of frequencies in order to track moving curves 102 due to changing piezoelectric motor 20 parameters while maintaining a certain degree of robustness towards changing piezoelectric motor 20 parameters by selecting sequences of frequencies that have bandwidths that include at least the range of operation.

If the resulting piezoelectric motor 20 performance is required to be sufficiently constant in an averaged sense, it is not necessary that a feedback signal is either produced, or evaluated to generate a modified sequence of frequencies, every time a sequence of frequencies, e.g., a sweep, is executed. In embodiments where a microcontroller is used, it can be advantageous to employ the feedback routine relatively rarely in order to free up resources, but sufficiently often to achieve an appropriate improvement of the piezoelectric motor 20 performance due to feedback. In particular, an adaptation of a sequence of frequencies is necessary if significant performance degradation is observed, for example, if no sensor 26 impulse is measured for a predetermined amount of time. Sensor 26 impulses may be used to trigger interrupts in a controller 23, such as in a microcontroller that is capable and configured to receive and evaluate interrupts, in order to enable the controller 23 to adapt the sequence of frequencies. Using an interrupt mechanism can further help free up microcontroller resources. An interrupt can also be used to reset a watchdog timer whenever a sensor 26 impulse is received. The watchdog timer could then automatically trigger a microcontroller interrupt if no sensor 26 impulse is measured for a predetermined amount of time thus enabling a microcontroller program to select a new sequence of frequencies at that time to improve piezoelectric motor 20 performance.

Further additions to the control methods include occasionally switching between the first sequence of frequencies and any subsequent sequence in order to use the first sequence again to determine the possibly changed range of operation of the piezoelectric motor 20. Also there is the possibility that the range of operation only partially overlaps with the bandwidth of a sequence of frequencies due to predictable and sometimes unpredictable changes of piezoelectric motor 20 properties, or due to an unwise choice of a sequence of frequencies, thus reducing piezoelectric motor 20 performance. When this occurs, the first sequence of frequencies can be selected again, or a new sequence of frequencies can be selected that has a broader bandwidth than the second sequence of frequencies. This should particularly be the case if no or an insufficient feedback signal is obtained for a certain period of time, say, for the duration of a frequency sweep. Said bandwidth can be subsequently broadened even further if still no feedback signal is generated, presumably because the driven element 22 is being moved insufficiently, until a feedback signal is observed, presumably because the driven element 22 is moving sufficiently again to cause a feedback signal.

The open-loop and feedback control methods discussed here are particularly useful if the piezoelectric motor 20's range of operation is known only in vague terms. In a preferred embodiment of the invention, this kind of feedback control is advantageously carried out with a microcontroller. There are thus provided methods for identifying operational frequencies of piezoelectric motor 20 and for using one or more of those operational frequencies to drive a piezoelectric motor 20 in a manner suitable to achieving an acceptable performance.

The control systems and methods that are described here are particularly suitable for controlling single-frequency piezoelectric motors 20. The control schemes can be used by themselves, in combination with each other, or used in various combinations with other existing control schemes. The piezoelectric motor 20 control is essentially open-loop but the control methods allow the repeated and intermittent update of the essentially open-loop control by way of means of feedback. The control methods provide an amount of robustness towards predictable and unpredictable changes of piezoelectric motor 20 parameters, which in part may also depend on the mechanical load encountered by the driven element 22. Predictable piezoelectric motor 20 parameter changes are foreseeable changes that are known at the time of the piezoelectric motor 20 control design. Predictable parameter changes are changes that can reasonably be expected during intended use of the piezoelectric motor 20 and driven element 22 and do not principally interfere with the application of the control methods disclosed herein. For example, changes in piezoelectric motor 20 temperature, ambient temperature, motor wear are predictable parameter changes, while motor breakage is not.

Figure 6:
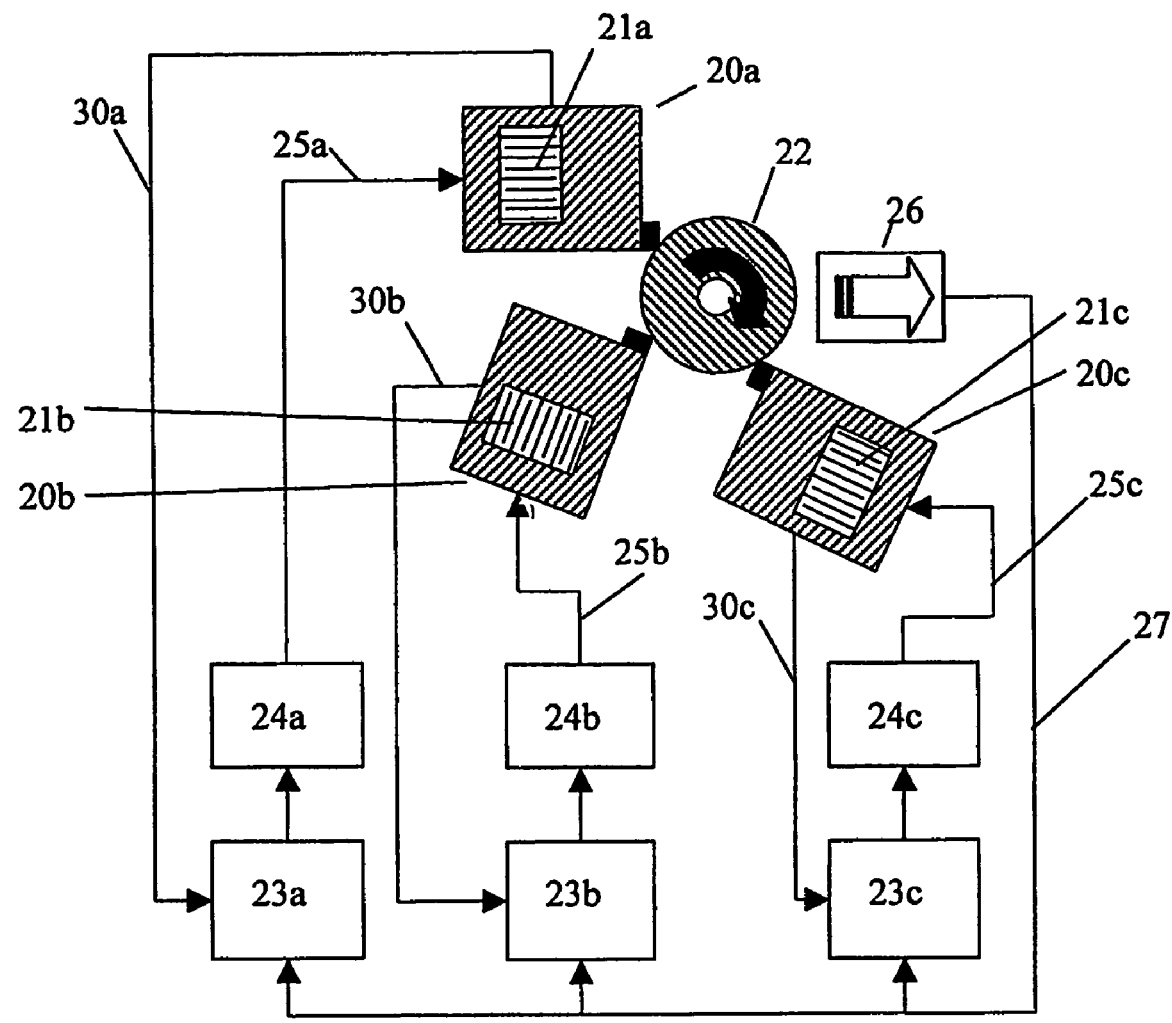
FIG. 6 is a block diagram with multiple single-frequency piezoelectric motors that are in driving communication with the same driven element.

Preferred embodiments may contain several piezoelectric motors 20 to move a single driven element 22. One such multi-motor configuration is illustrated in the schematic diagram of FIG. 6 where three piezoelectric motors 22a, 22b, 22c are in simultaneous driving contact with a single driven element 22. The piezoelectric motors 22a, 22b, 22c may be supplied with individual electric control signals 25a, 25b, 25c from separate electric driver circuits 24a, 24b, 24c, that are controlled from separate controllers 23a, 23b, 23c. Alternatively, the piezoelectric motors 22a, 22b, 22c may be supplied with the same electric control signal 25 from one electric driver circuit 24 and one controller 23 in which case signals 25a, 25b, 25c are identical, drivers 24a, 24b, 24c are one and the same, and controllers 23a, 23b, 23c are one and the same.

Alternatively, a single controller 23 may control the individual driver circuits 24a, 24b, 24c generating electric signals 25a, 25b, 25c, in which case controllers 23a, 23b, 23c are one and the same. The piezoelectric motors 22a, 22b, 22c have individual feedback paths 30a, 30b, 30c. Controllers 23a, 23b, 23c share the same feedback from a device 26 that detects motion of the driven element 22. In multi-motor applications, an advantageous averaging of mechanical piezoelectric motor 20a, 20b, 20c output across all piezoelectric motors 20a, 20b, 20c that are engaged with the driven element 22 goes into effect. A multi-motor configuration can also have two or more piezoelectric motors 20 in driving contact with a single driven element 22. The individual piezoelectric motors 20 can be of identical design and manufacture but may also be different, which may further produce an advantageous averaging effect where the strength and weaknesses of various piezoelectric motor 20 designs and manufactures are balanced.

The above description is given by way of example, and not limitation. Given the above disclosure, one skilled in the art could devise variations that are within the scope and spirit of the invention, including various ways of arranging the piezoelectric motors 20 and of selecting appropriate sequences of frequencies and of sweeping these frequencies. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

What is claimed is:

1. A method for controlling a piezoelectric motor, the piezoelectric motor being configured to move a driven element when a sinusoidal electric signal of a first frequency is supplied to the piezoelectric motor with an amplitude that is sufficient to move a driven element a predetermined distance, comprising:
    selecting a predetermined first sequence of frequencies, the first sequence of frequencies comprising at least two mutually different frequencies;
    creating individual waveforms corresponding to each frequency of the first sequence of frequencies so that each individual waveform has a predetermined finite duration and amplitude and is periodic with a period that is the inverse of the corresponding frequency;
    concatenating the individual waveforms into a single first electric signal and supplying said signal repeatedly to the piezoelectric motor to move the driven element; and
    wherein the selected first sequence of frequencies comprises a sufficient number of frequencies that are distributed to cause the piezoelectric motor to move the driven element even when the properties of the piezoelectric motor change within a predictable range.

2. The method of claim 1, wherein the piezoelectric motor has a performance that, when averaged over the duration of the single first electric signal, said performance does not vary more than 30% when the properties of the piezoelectric motor change within a predictable range.

3. The method of claim 1, wherein the single first electric signal causes the piezoelectric motor to move the driven element with a varying performance, further comprising:
    monitoring the motion of the driven element;
    selecting the first sequence of frequencies to further comprise a sufficient number of frequencies that are distributed to cause the piezoelectric motor to move the driven element so that the motion of the driven element is maintained within a predetermined value as determined by the monitoring of the driven element and so that said monitoring cannot perceive the varying performance caused by the first electric signal.

4. The method of claim 1, further comprising a motion detector that provides a feedback signal when the motion of the driven element passes at least one selected threshold, the method further comprising:
    analyzing the feedback signal to determine an estimated frequency at which the piezoelectric motor can movie the driven element when a sinusoidal electric signal of the estimated frequency is supplied to the piezoelectric motor;
    selecting a second sequence of frequencies comprising at least the estimated frequency and at least one other frequency that is different from the estimated frequency to generate a second electric signal in accordance with the method of generating the first electric signal to cause the piezoelectric motor to move the driven element with an average performance that is higher than the average performance of the piezoelectric motor was before the estimated frequency was determined;
    repeatedly analyzing the feedback signal and selecting a second sequence of frequencies as often as needed to achieve a desired duration and distance of motion and a desired average motor performance.

5. The method of claim 4, wherein the second sequence of frequencies comprises at least one frequency that is smaller than the estimated frequency and at least one frequency that is larger than the estimated frequency.

6. The method of claim 4, further comprising:
    analyzing the feedback signal to determine if the motion of the driven element has been less than a predetermined value for a predetermined amount of time;
    modifying the second sequence of frequencies when the predetermined amount of time has passed to have at least a difference between the largest and the smallest frequency of the sequence that is larger than the difference between the largest and the smallest frequency of the unmodified second sequence;
    repeatedly analyzing the feedback signal and modifying the second sequence until it is determined that the motion of the driven element is no longer less than the predetermined value for that predetermined amount of time.

7. The method of claim 1, wherein the first sequence of frequencies is selected to cause the piezoelectric motor to move the driven element by a defined distance even if the properties of the piezoelectric motor change due to predictable causes.

8. The method of claim 7, further comprising the step of supplying the first electric signal a predetermined number of times per second to cause the piezoelectric motor to move the driven element at a defined speed.

9. The method of claim 1, wherein any two consecutive frequencies each produce a piezoelectric motor performance comprising at least one of (the speed of the motor, the speed of the driven element, the motion of the motor, the motion of the driven element, and power consumption of the motor), with a performance difference between each of two said consecutive frequencies that is no more than a predetermined value.

10. The method of claim 1, wherein the frequencies are selected to produce a predetermined audible sound that is generated by the piezoelectric motor.

11. A method for selecting a sequence of frequencies for controlling a piezoelectric motor to move a driven element, the piezoelectric motor being configured to move the driven element when a sinusoidal electric signal of a first frequency is supplied to the piezoelectric motor with an amplitude that is sufficient to move a driven element a predetermined distance, comprising:
selecting at least two frequencies that are mutually different to form a sequence of frequencies to cause the piezoelectric motor to move the driven element when individual waveforms corresponding to each frequency of said sequence of frequencies are concatenated to form an electric signal that is supplied repeatedly to the piezoelectric motor to move the driven element, each of said individual waveforms having a predetermined finite duration and amplitude and being periodic with a period that is the inverse of the corresponding frequency;
selecting the at least two frequencies to further cause the piezoelectric motor to move the driven element even if when the properties of the piezoelectric motor change within a predictable range.

12. The method of claim 11, further comprising the step of selecting the at least two frequencies to cause the piezoelectric motor to move the driven element by a defined distance.

13. The method of claim 12, further comprising the step of selecting the duration of each of said individual waveforms to cause the piezoelectric motor to move the driven element with a defined speed.

14. The method of claim 11, wherein the at least two frequencies each cause the piezoelectric motor to move the driven element with a different varying performance, further comprising the step of
monitoring the motion of the driven element; and
selecting the sequence of the at least two frequencies to further comprise a sufficient number of frequencies that are distributed to cause the piezoelectric motor to move the driven element so that the monitored motion of the driven element meets predetermined criteria said monitoring of the motion of the driven element cannot perceive the varying performance.

15. The method of claim 11, wherein the piezoelectric motor further comprises a motion detector providing a feedback signal when the motion of the driven element passes at least one selected threshold, the method further comprising:
analyzing the feedback signal to determine an estimated frequency at which the piezoelectric motor can move the driven element when a sinusoidal electric signal of the estimated frequency is supplied to the piezoelectric motor;
selecting the at least two frequencies to comprise the estimated frequency to cause the piezoelectric motor to move the driven element with an average performance that is higher than an the average performance of the piezoelectric motor was before the estimated frequency was determined.

16. The method of claim 11, wherein the piezoelectric motor comprises a motion detector providing a feedback signal when the motion of the driven element passes at least one selected threshold, the method further comprising:
analyzing the feedback signal to determine if the motion of the driven element has been less than a predetermined movement for a predetermined amount of time;
modifying the sequence of the at least two frequenices when the predetermined amount of time has passed to have at least a difference between the largest and the smallest frequency of the sequence that is larger than the difference between the largest and the smallest frequency of the unmodified sequence.

17. The method of claim 10, wherein the selected frequencies are inaudible.

18. A piezoelectric system having a piezoelectric motor driving a driven element so as to move the driven element in response to an electric signal, the motor having at least a first sinusoidal operating frequency at which the motor moves the driven element an amount that meets predetermined criteria, the motor and driven element having a desired performance criteria when operated at that first operating frequency, the system comprising:
a plurality of concatenated individual waveforms to form an electric signal that is repeatedly supplied to the piezoelectric motor to move the driven element, wherein each of said waveforms has a predetermined finite duration and amplitude and further is periodic with a period that is the inverse of a predetermined non-zero frequency associated with the waveform, at least two of the frequencies associated with the plurality of concatenated individual waveforms being mutually different, and at least one of the frequencies associated with the plurality of concatenated individual waveforms being sufficiently close to the first operating frequency to cause detectable motion of the driven element.

19. The piezoelectric system of claim 18, wherein the frequencies associated with the plurality of concatenated individual waveforms are varied in response to movement of at least one of the motor and the driven element to produce an average performance of the motor and driven element for a time corresponding to the total duration of the plurality of concatenated individual waveforms that is greater than an actual performance of the motor and driven element for the same period of time but when the actual performance is less than the desired performance.

20. The piezoelectric system of claim 19, wherein the performance criteria includes at least one of the speed of the driven element, the force exerted by the motor on the driven element, and the power consumed by the motor.

21. The piezoelectric system of claim 18, wherein the frequencies associated with the plurality of concatenated individual waveforms are a continually increasing series of frequencies.

22. The piezoelectric system of claim 18, wherein the frequencies associated with the plurality of concatenated individual waveforms are a continually decreasing series of frequencies.

23. The piezoelectric system of claim 18, further comprising means for intermittently varying the frequencies associated with the plurality of concatenated individual waveforms while maintaining at least one frequency which causes sufficient motion of one of the motor or driven element to be detected by a sensor.

24. The piezoelectric system of claim 23, wherein the means for intermittently varying the frequencies associated with the plurality of concatenated individual waveforms comprises a microcontroller.

25. The piezoelectric system of claim 24, further comprising a motion detector to provide a signal when the motion of the driven element passes at least one selected threshold:
wherein the microcontroller is capable of receiving and evaluating an interrupt and is further configured to vary the frequencies associated with the plurality of concatenated individual waveforms when the signal triggers said interrupt of the microcontroller.

26. The piezoelectric system of claim 18, further comprising:
a motion detector to provide a signal when the motion of the driven element passes at least one selected threshold;
a microcontroller configured to intermittently vary the frequencies associated with the plurality of concatenated individual waveforms;
a timer to cause the microcontroller to maintain at least one frequency which causes sufficient motion of one of the motor or driven element to be detected by a sensor when the signal provided by the motion detector signals that the motion of the driven element has been less than a predetermined value desired for a predetermined amount of time.

* * * * *